(12) United States Patent
Covington et al.

(10) Patent No.: US 7,322,460 B2
(45) Date of Patent: Jan. 29, 2008

(54) PIVOTING UNLOADING DOOR ASSEMBLY AND COMMON CONVEYOR DRIVE FOR DOOR SEGMENTS THEREOF

(75) Inventors: Michael J. Covington, Bettendorf, IA (US); Timothy A. Meeks, Davenport, IA (US); Gary R. Gallens, Geneseo, IL (US)

(73) Assignee: CNH America LLC, New Holland, PA (US)

( * ) Notice: Subject to any disclaimer, the term of this patent is extended or adjusted under 35 U.S.C. 154(b) by 365 days.

(21) Appl. No.: 11/092,239

(22) Filed: Mar. 29, 2005

(65) Prior Publication Data

US 2005/0217508 A1    Oct. 6, 2005

Related U.S. Application Data

(60) Provisional application No. 60/557,911, filed on Mar. 30, 2004.

(51) Int. Cl.
*B65G 23/34* (2006.01)

(52) U.S. Cl. .................. 198/581; 198/300; 198/598; 198/692; 414/467; 414/505; 414/523; 414/525.1; 414/528; 414/537; 460/119; 56/449

(58) Field of Classification Search ................ 198/300, 198/581, 598, 692; 414/467, 505, 523, 528, 414/525.1, 537; 100/88; 460/119; 56/449
See application file for complete search history.

(56) References Cited

U.S. PATENT DOCUMENTS

| | | | |
|---|---|---|---|
| 668,741 A | 2/1901 | Pridmore | 56/744 |
| 1,704,841 A | 3/1929 | Sacerdote | 414/523 |
| 2,325,433 A | 7/1943 | Sprinkle | 198/13 |
| 2,490,381 A | 12/1949 | Shields | 198/88 |
| 3,071,237 A | 1/1963 | Powell | 198/91 |
| 3,103,274 A | 9/1963 | Mayrath | 198/108 |
| 3,504,782 A | 4/1970 | Slagle | 198/29 |
| 3,650,376 A * | 3/1972 | Burgis et al. | 198/633 |
| 3,894,646 A | 7/1975 | Head et al. | 214/522 |
| 4,072,242 A | 2/1978 | Cook | 214/522 |
| 6,766,634 B2 * | 7/2004 | Covington et al. | 56/480 |

* cited by examiner

*Primary Examiner*—Gene O. Crawford
*Assistant Examiner*—Kavel Singh
(74) *Attorney, Agent, or Firm*—Michael G. Harms; John William Stader; Patrick M. Sheldrake

(57) ABSTRACT

A pivoting unloading door for ramp assembly and common conveyor drive for door or ramp segments thereof. The door or ramp segments are pivotable about a pivotal axis between a folded or closed position in generally overlaying relation one to the other, and an unfolded or open unloading position in parallel, end-to-end relation, the door segments including conveyors thereon for conveying objects or matter thereover when in the unloading position. The door assembly includes a common drive for the conveyors which is disposed beneath the conveyors in the unloading position in coaxial relation with the pivotal axis, and which is operable for simultaneously moving the conveyors. The output of the drive can extend through a pivot joint connecting the door segments, and can connect the elements of the pivot joint.

24 Claims, 6 Drawing Sheets

PIVOTING UNLOADING DOOR ASSEMBLY AND COMMON CONVEYOR DRIVE FOR DOOR SEGMENTS THEREOF

This application claims the benefit of U.S. Provisional Application No. 60/557,911, filed Mar. 30, 2004.

TECHNICAL FIELD

This invention relates generally to a pivoting unloading door or ramp, particularly including door or ramp segments pivotable about a pivotal axis between a folded or closed position in generally overlaying relation one to the other, and an unfolded or open unloading position in parallel, end-to-end relation, the door segments including conveyors thereon for conveying objects or matter thereover when in the unloading position, and a common drive for the conveyors which is compactly disposed beneath the conveyors in the unloading position in coaxial relation with the pivotal axis.

BACKGROUND ART

Commonly, receivers for harvested crops, such as baskets and cotton compacting chambers of cotton module builders and packagers, include a live floor, that is, a floor including at least one conveyor such as a chain thereon for moving crops such as cotton, particularly, a compacted body or module of cotton, across the floor and through an open unloading doorway of the receiver and onto a conveyor surface of an unloading door or ramp. Such cotton modules presently can weigh as much as about 11,000 pounds, and it is desirable for the floor of the receiver and the conveyor surface of the door or ramp to be substantially coplanar, unobstructed, and also smooth and provide a low friction surface for conveyance of the cotton module thereover. This is to minimize forces required to be exerted against the body or module of cotton for conveying it from the receiver and over the door or ramp and onto the ground or another location, and to minimize exertion of forces thereagainst which would tend to weaken or break the compacted module apart, such that the module is conveyed from the receiver and over the door or ramp in a controlled manner and in as intact a state as possible. It is further contemplated to provide an upper surface on the floor of the cotton receiver and on the conveying surface of the door or ramp, composed of a sheet or layer of a low friction material, and it would be desirable that, with this surface or layer, the door or ramp be still capable of pivoting relative to the floor without interference. It is still further contemplated that the conveyors of the door or ramp be commonly driven and pivotable relative to the floor of the receiver without interference or other problems.

Therefore, what is sought is to provide one or more of the advantages and overcome one or more of the problems set forth above.

SUMMARY OF THE INVENTION

What is disclosed is a pivoting conveyor door assembly and common conveyor drive arrangement which provides one or more of the advantages and overcomes one or more of the problems set forth above.

According to a preferred aspect of the invention, a pivoting conveyor door assembly includes a first door segment including a first conveying surface thereon including at least one endless conveyor extending in a predetermined direction thereover between opposite first and second end portions thereof, and a second door segment including a second conveying surface thereon including at least one endless conveyor extending in the predetermined direction thereover between first and second end portions thereof. The assembly preferably includes a first pivot arm extending from the second end portion of the first door segment opposite the conveying surface thereof, and a second pivot arm extending from the first end portion of the second door segment opposite the conveying surface thereof. The first and second pivot arms have distal end portions pivotably connected for relative pivotal movement of the door segments about a pivotal axis extending through the distal end portions transversely to the predetermined direction, between a folded or closed position in generally overlaying relation with the first and second conveying surfaces facing in opposite directions, and an open or unloading position in end-to-end relation wherein the first and second conveying surfaces form a substantially continuous surface extending in the predetermined direction and the pivotal axis is located beneath the substantially continuous surface. The assembly preferably additionally includes a compact, common door conveyor drive having an output rotatable about a rotational axis therethrough, the door conveyor drive being supported by at least one of the door segments such that the output is substantially coaxial with the pivotal axis and the output and the drive are unobtrusively located beneath the substantially continuous surface when the door segments are in the open position, the output being connected in rotatably driving relation to rotatable elements on both the first and second door segments drivingly connected with the conveyors thereof, respectively, such that rotation of the output by the drive will simultaneously drivingly rotate the rotatable elements and move the conveyors over the door segments in the predetermined direction at desired speeds which can be the same or slightly different.

According to another preferred aspect of the invention, the output is connected in rotatably driving relation to the rotatable elements by endless elements encircling the output and at least one of the rotatable elements on each of the door segments, respectively.

According to another preferred aspect of the invention, the conveying surfaces of the door segments are each of a low friction material. Further, the conveying surfaces of the door segments are preferably in edge-to-edge relation when the door segments are in the open position.

According to still another preferred aspect of the invention, the first and second pivot arms are connected for relative pivotal movement about the pivotal axis by a pivot joint through the distal ends thereof, and about the output of the drive which extends through and is rotatable relative to the pivot joint. Alternatively, the drive can be separate from, but still coaxial with, the pivot joint.

Still further, the first end portion of the first door segment is preferably mounted and supported on a cotton module builder such that in the folded position the first door segment will be located in a generally upstanding orientation in at least partially covering relation to an opening in connection with a cotton compacting chamber of the module builder and the second door segment will be in overlaying relation to the first door segment with the drive located therebetween, and such that when in the open position the door segments will extend outwardly from the opening in at least substantially parallel relation to a floor in the chamber to form a substantially continuous, flat path for conveying of cotton modules thereover. The floor of the module builder preferably includes at least one endless conveyor movable thereover in the predetermined direction by a floor conveyor drive operable independently of the door conveyor drive, and the drives are preferably controlled such that operation of the floor drive can be ceased when a cotton module passes from the chamber such that loose cotton that falls onto the floor as the module passes therefrom will be retained in the chamber.

As a result, smooth, unobstructed, controlled conveyance of a cotton module or other compacted body of cotton from a module building chamber or other receiver can be achieved, without requiring exertion of strong forces thereagainst which could jeopardize the integrity of the module or other body.

DETAILED DESCRIPTION OF THE INVENTION

Figure 1:
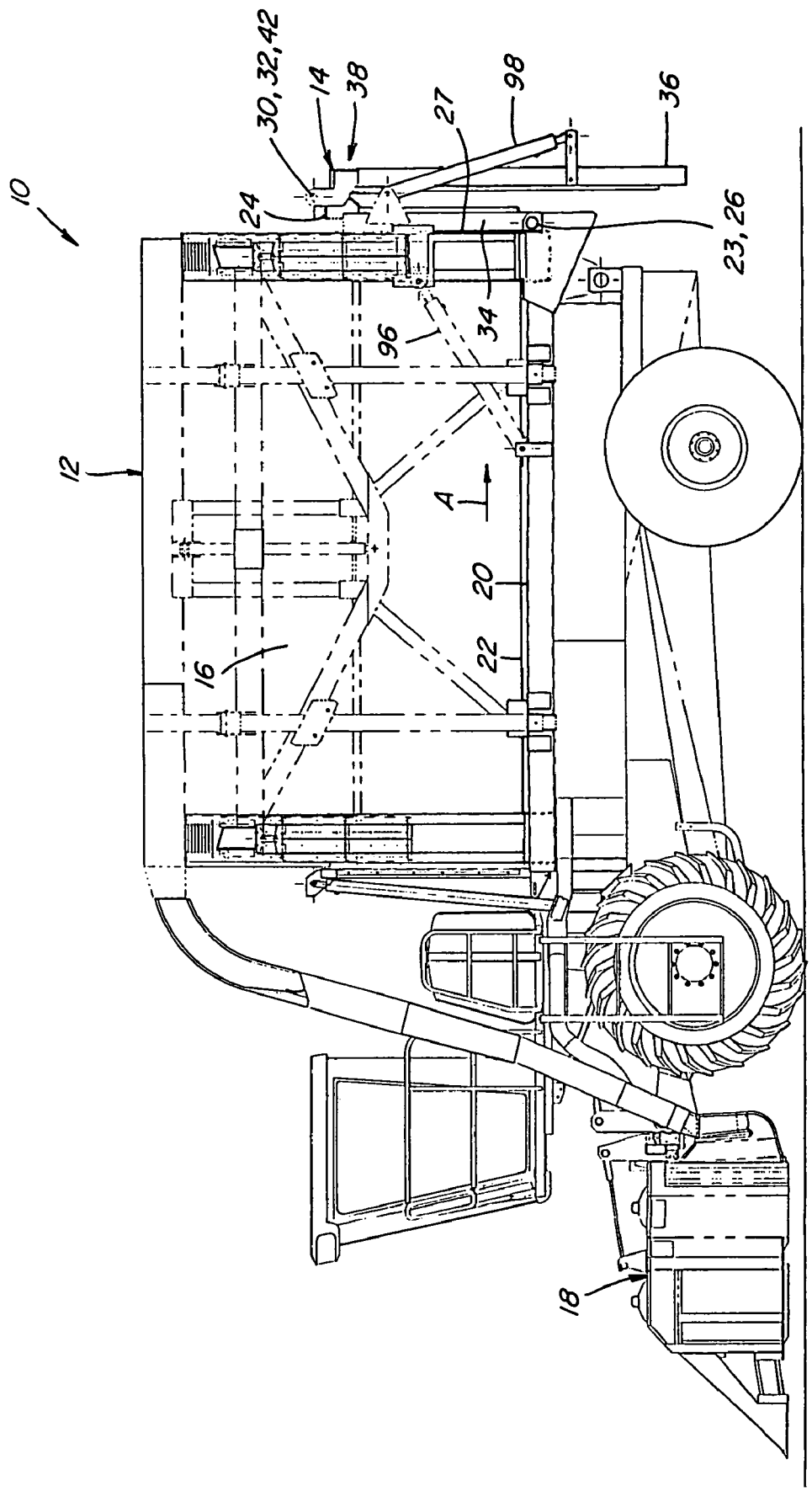
FIG. 1 is a simplified side view of a cotton harvesting machine, including a pivoting unloading door assembly including a common conveyor drive for door segments thereof, in a folded or closed position in relation to an unloading opening of a module builder of the machine.

Referring now to the drawings, in FIG. 1, a cotton harvesting machine 10 is shown, including a cotton packager or module builder 12, and a pivoting unloading door assembly 14 constructed and operable according to teachings of preferred aspects of the invention, in a folder or closed position. Cotton packager 12 includes an interior that defines a cotton compacting or module building chamber 16 for receiving cotton from harvesting units 18 of machine 10 and in which the harvested cotton is compacted into a unitary body or module of cotton (not shown) in the well known conventional manner. It should be noted that for the purposes herein, the terms ramp and door are considered to be interchangeable, and that the term cotton module builder is to encompass a cotton packager and also a basket.

The bottom of chamber 16 is defined and enclosed by an upwardly facing floor surface 20 comprised of one or more sheets of a low friction polymer material, such as, but not limited to, a high density polyethylene, an ultrahigh molecular weight polyethylene, or a similar low friction plastic material preferably having a coefficient of friction within a range of from about 0.1 to about 0.3, for facilitating sliding and sealing engagement between the surfaces. A plurality of conveyor chains 22 extend forwardly and rearwardly in spaced relation one to the other over floor surface 20 and encircle floor conveyor drive sprockets 23 at the rearward end of floor surface 20, and suitable elements at the forward end thereof (not shown). Conveyor chains 22 and drive sprockets 23 are rotatably drivable using a suitable drive mechanism, which can include a motor, such as, but not limited to, a fluid or electric motor, for moving chains 22 in a predetermined unloading direction, denoted by arrow A, over floor surface 20, for conveying a compacted body or module of cotton from the interior of the chamber.

Floor 20 can comprise a plurality of individual sheets of the low friction polymer material disposed between conveyor chains 22, or one or more larger sheets, and can be located beneath chains 22 for providing a low friction supporting surface therefor. Alternatively, several elements such as channeled guides or the like can be provided beneath chains 22, as desired.

Figure 2:
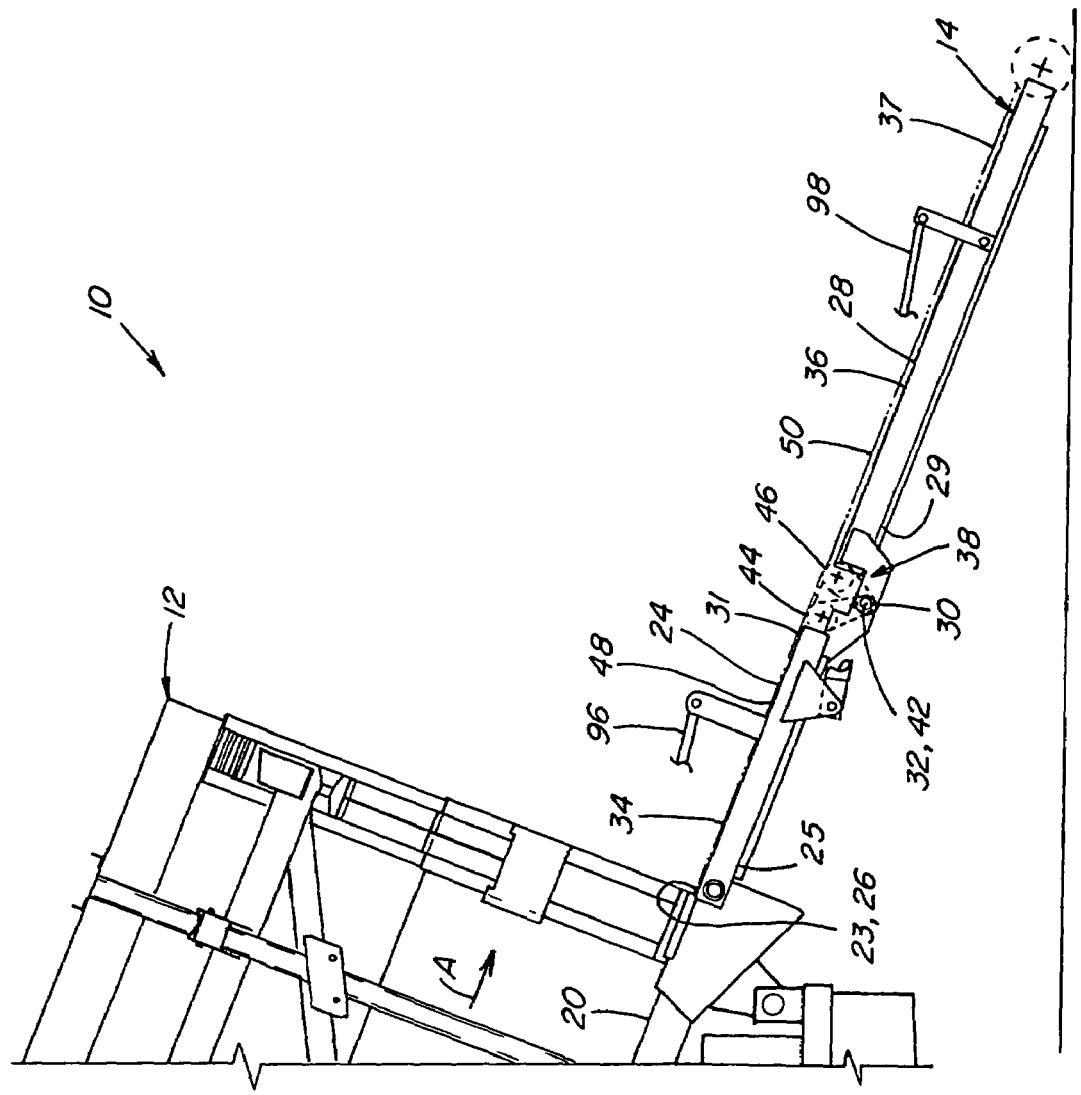
FIG. 2 is a simplified fragmentary side view of the module builder of FIG. 1, showing the door assembly of the invention in an unfolded or unloading position.

Referring also to FIG. 2, unloading door assembly 14 includes a first door segment 24 having a first end portion 25 pivotally connected at a pivot joint 26 to the rearward end of cotton module builder 12 of machine 10, for pivotal movement of door segment 24 between a closed position in at least partial closing or covering relation to a rear unloading opening 27 as shown in FIG. 1, and an unloading or open position as shown in FIG. 2. Door assembly 14 additionally includes a second door segment 28 having a first end portion 29 pivotally connected by a pivot joint 30 to a second end portion 31 of first door segment 24 for relative pivotal movement of door segments 24 and 28 about a pivotal axis 32 extending through joint 30 transversely to predetermined direction A, between a folded or closed position (FIG. 1) with door segments 24 and 28 in generally overlaying relation and first and second conveying surfaces 34 and 36 thereof, respectively, facing in opposite directions, and an unfolded or open unloading position (FIG. 2) in end-to-end relation wherein floor surface 20 and first and second conveying surfaces 34 and 36 form a substantially continuous surface 37 extending in the predetermined direction A. Pivotal movement of first and second door segments 24 and 28 is effected, respectively, by fluid cylinders 96 and 98, in the well known manner. Pivotal axis 32 is located beneath substantially continuous surface 37 when door segments 24 and 28 are in the unloading position.

Conveying surfaces 34 and 36 preferably each comprise one or more low friction polymer sheets, such as of the above described material, for low friction movement of a compacted body of cotton thereover. The polymer sheets of surfaces 34 and 36 can support chains 20 in the above-described manner, or separate channels or other elements can be used. Additionally, surfaces 34 and 36 can each comprise a single large sheet of the low friction material, or two or more pieces as desired.

Referring also to FIGS. 3, 4, 5 and 6, door assembly 14 includes a common door conveyor drive 38, which preferably includes a suitable power source or motor such as a fluid motor, electric motor or the like, having an output 40 rotatable about a rotational axis 42 therethrough. Door conveyor drive 38 is preferably supported by at least one of door segments 24 and 28 such that rotational axis 42 of output 40 is substantially coaxial with pivotal axis 32, and output 40 and drive 38 are preferably located beneath the substantially continuous surface defined by conveying surfaces 34 and 36 when door segments 24 and 28 are in the unfolded or open position, so as not to obstruct conveyance of a cotton module over surfaces 34 and 36. Output 40 is connected in rotatably driving relation to rotatable elements 44 and 46 on both first and second door segments 24 and 28, respectively, which, in turn, are drivingly connected with endless conveyor chains 48 and 50 thereof, respectively. Conveyor chains 48 and 50 encircle sprockets 52 and 54 on rotatable elements 44 and 46, respectively, and sprockets 56 and 58 or other elements at the opposite ends of door segments 24 and 28, respectively, such that rotation of output 40 by drive 38 will simultaneously drivingly rotate rotatable elements 44 and 46 and move conveyor chains 48 and 50 over door segments 24 and 28 in predetermined direction A at desired speeds, which can be the same or slightly different.

Preferably, to achieve the above capability, output 40 includes first and second drive sprockets 60 and 62 thereon and rotatable therewith. Also preferably, rotatable elements 44 and 46 include first and second driven sprockets 64 and 66 thereon and rotatable therewith, respectively. First drive sprocket 60 is preferably connected in rotatably driving relation to first driven sprocket 64, by an endless first drive chain 68 which encircles sprockets 60 and 64. Second drive sprocket 62 is preferably connected in rotatably driving relation to second driven sprocket 66, by a second endless drive chain 70 which encircles sprockets 62 and 66. As a result, when output 40 and drive sprockets 60 and 62 are rotated in the direction denoted by arrow B in FIG. 3, the driven sprockets 64 and 66, rotatable elements 44 and 46, and sprockets 52 and 54, are rotated as denoted by arrows C, such that conveyor chains 48 and 50 are moved simultaneously at the desired speeds. Here, drive sprocket 62 is slightly larger than drive sprocket 60, and driven sprockets 64 and 66 are the same sized, such that conveyor chain 50 will be moved at a correspondingly faster speed than chain 48. Alternatively, sprockets 60 and 62 can be the same size, and sprockets 64 and 66 can be the same size, such that the conveyor chains will be moved at the same speed.

Figure 3:
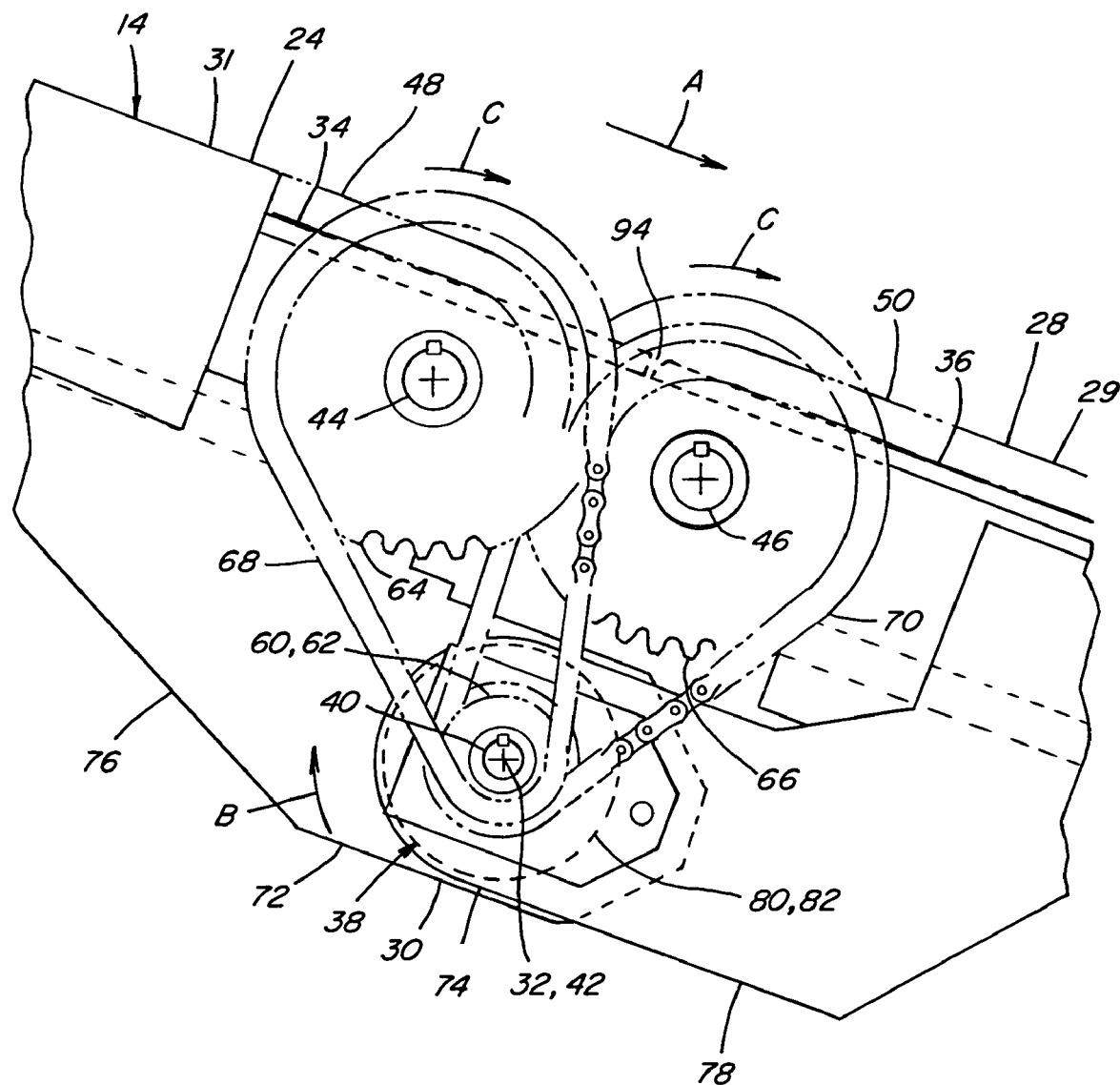
FIG. 3 is an enlarged fragmentary side view of the door assembly, particularly a common drive for conveyors on segments of the door assembly.
Figure 4:
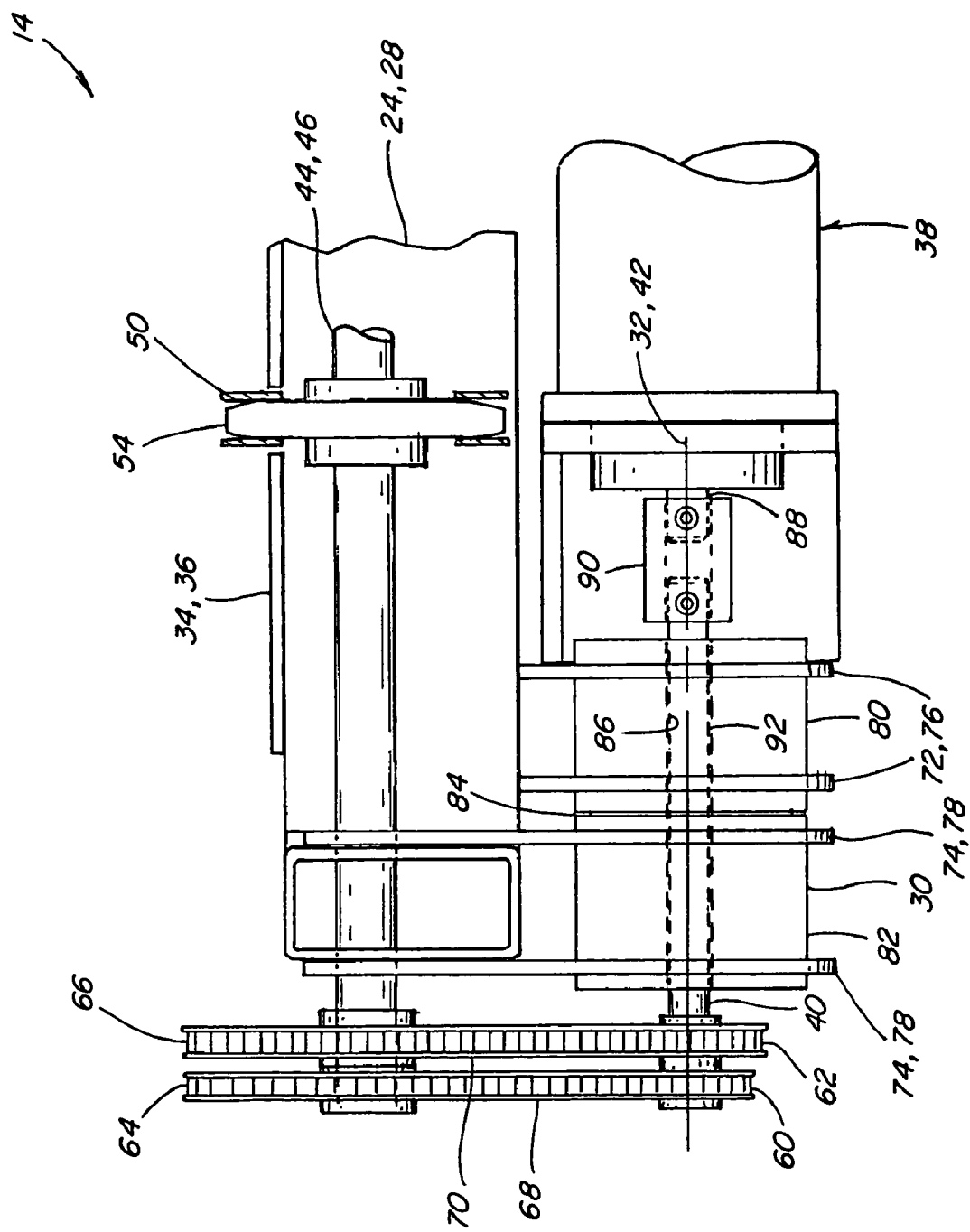
FIG. 4 is a simplified fragmentary end view of the door assembly and drive.

Because drive 38 and output 40 thereof are coaxial with pivotal axis 32 of pivot joint 30, drive 38 is located beneath conveying surfaces 34 and 36 and thus continuous surface 37, when door segments 24 and 36 are in the unloading position, as best illustrated in FIGS. 3 and 4. By locating drive 38 beneath conveying surfaces 34 and 36, there is a much decreased possibility of problems, such as contact with and obstruction of a cotton module being conveyed over the surfaces. Additionally, drive 38 is preferably located inwardly of the side peripheries of door segments 24 and 28, to reduce the possibility of contact with obstacles, such as sign or fence posts, during movements of machine 10.

As another advantage, when door segments 24 and 28 are in their folded or closed position (FIGS. 1 and 5), drive 38 is disposed thereabove and therebetween, so as to also be protected when door assembly 14 is in the folded mode. As still another advantage, because of the location of drive 38, lines thereto and/or therefrom, such as fluid lines, power lines, and/or control lines, can be easily routed so as to also be located beneath surfaces 34 and 36 when door assembly 14 is in the open position, and so as to be protected when the door assembly is in the closed position.

Preferably, pivot joint 30 is located on distal ends 72 and 74 of first and second pivot arms 76 and 78 extending downwardly from second end portion 31 of first door segment 24, and first end portion 29 of second door segment 28, respectively. Pivot arm 76 of first door segment 24 extends downwardly and rearwardly from second end portion 31 thereof, while pivot arm 78 extends downwardly and forwardly of first end portion 29 of door segment 28, when door segments 24 and 28 are in the unloading position, as shown in FIG. 3, such that distal ends 72 and 74 overlap. Pivot joint 30 includes first and second tubular cylindrical pivot members 80 and 82, which extend through and are mounted in distal ends 72 and 74 of pivot arms 76 and 78, respectively, which pivot members 80 and 82 include axial ends in abutment at location 84, for relative pivotal movement about axis 32 and 42. Pivot members 80 and 82 form a continuous axial passage 86 therethrough, which receives output 40 of drive 38 for rotation relative thereto. Output 40 of drive 38 preferably is a shaft assembly including an output shaft 88 extending axially from drive 38, and connected by a union 90 to an extender shaft 92 which extends through axial passage 86 and sidewardly past pivot joint 30, and on which is mounted first and second drive sprockets 60 and 62. Here, drive 38 is mounted to distal end 72 of pivot arm 76, which is the more inwardly positioned arm, such that drive 38 is safely out of the way of cotton modules conveyed over door segments 24 and 28 when in the unloading position, and so as to be protected from contact with fence posts, signs, trees, and the like, when in both the unloading and folded positions. As a result, extender shaft 92 serves as the pivotal connection between door segments 24 and 28, union 90 serving to relieve and reduce any stresses that may be transferred from shaft 92 to shaft 88, to thereby reduce the possibility of exertion of possibly damaging forces against drive 38.

Figure 4A:
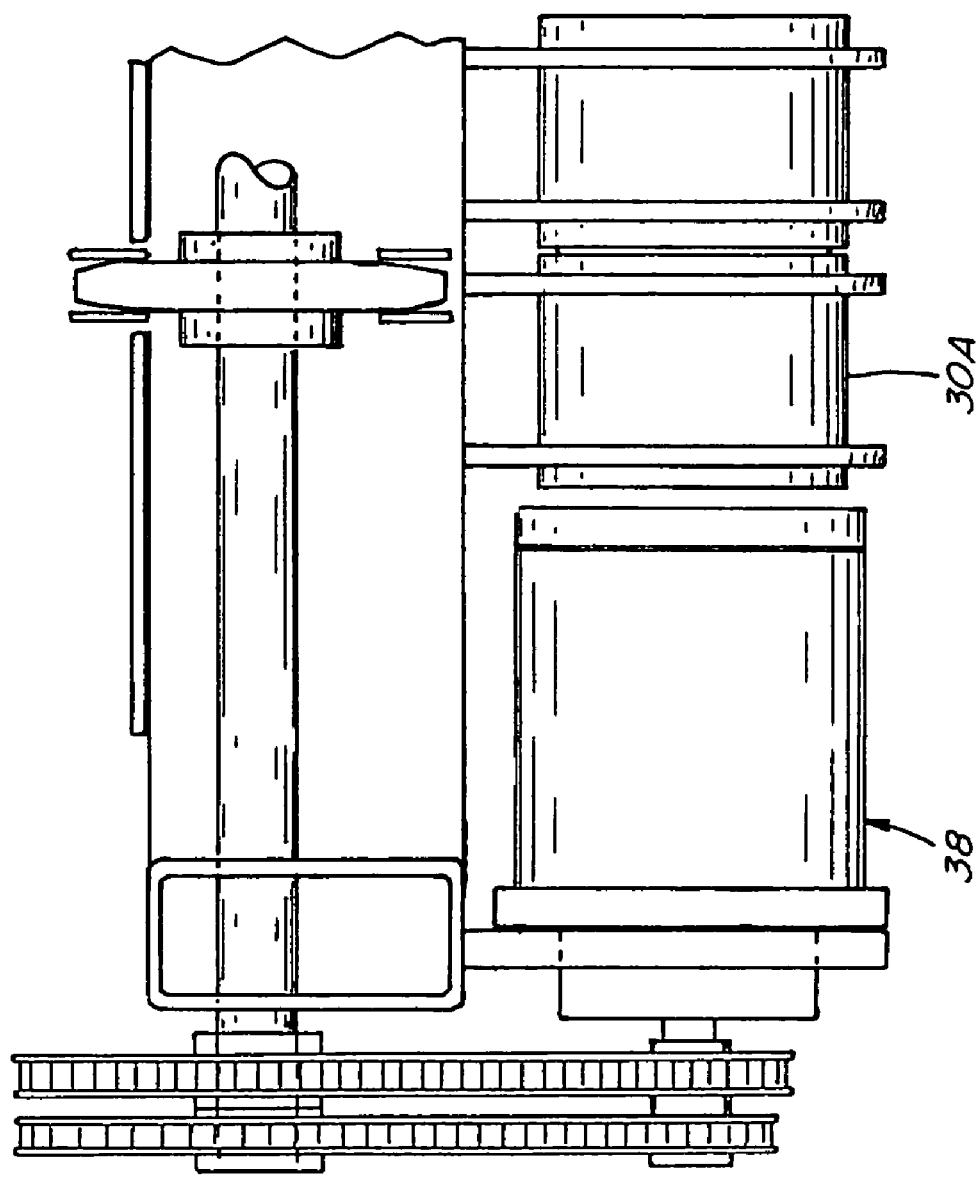
FIG. 4A is a simplified fragmentary end view showing an alternative location for the drive.
Figure 5:
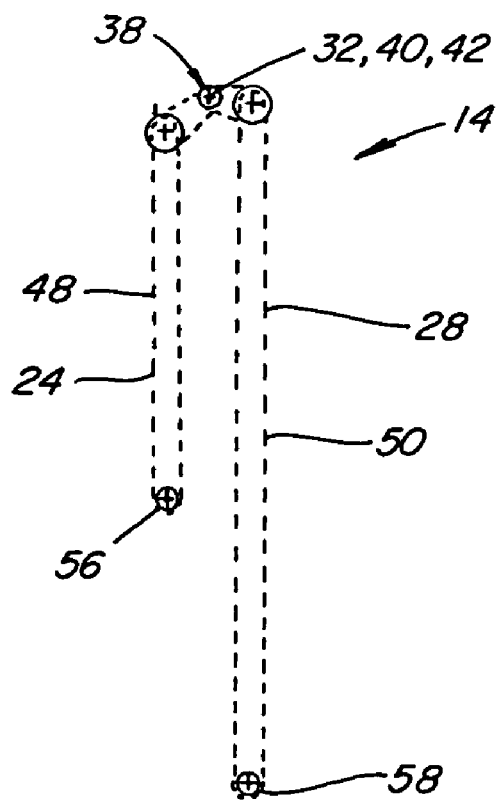
FIG. 5 is a simplified schematic representation of the door assembly in its folded or closed position.
Figure 6:
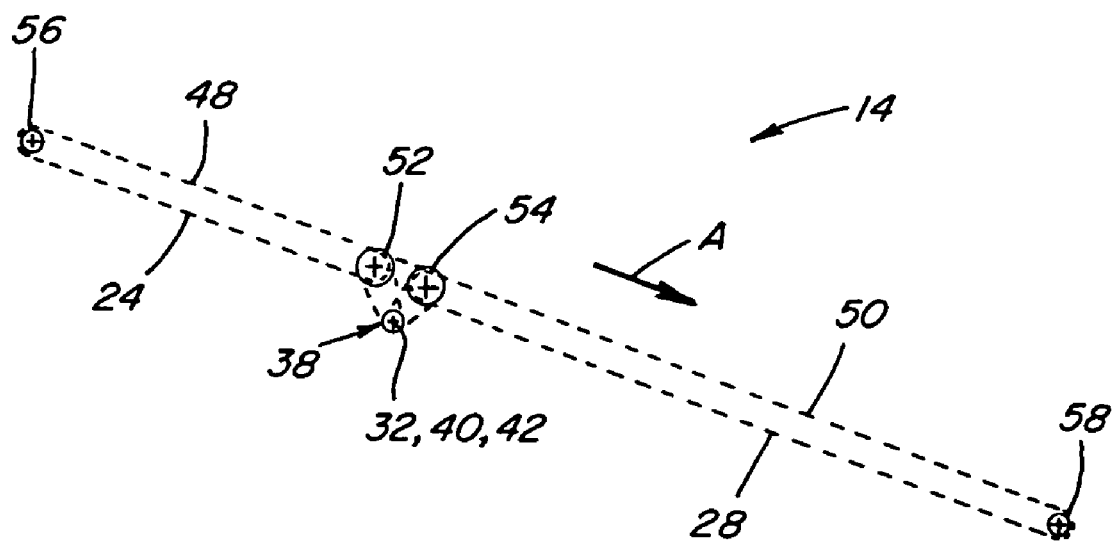
FIG. 6 is a simplified schematic representation of the door assembly in its open or unloading position.

Referring also to FIG. 4A, alternatively, drive 38 can be separate from pivot joint 30, for instance, by locating pivot joint 30 inwardly of drive 38, such as shown by alternative pivot joint 30A.

Here, it can be noted as shown in FIG. 3, that conveying surfaces 34 and 36 can be brought into end-to-end, closely spaced or abutting relation, when door assembly 14 is brought into the unfolded position, for providing the substantially continuous surface thereover. In this regard, conveying surface 36 can include an upwardly facing bevel 94 on the edge thereof extending transversely to direction A, for avoiding snagging of cotton modules that are conveyed thereover. It can also be observed in FIG. 3 that driven sprockets 64 and 66 of drive 38 can overlap, and as a result, conveyor chains 48 and 50 can overlap in sidewardly offset relation, such that chains 48 and 50 extend continuously over the unfolded length of door assembly 14.

As noted above, an advantage of locating drive 38 on door assembly 14 in common driving relation to conveyor chains 48 and 50 on both door segments 24 and 28, is that conveyor chains 48 and 50 can be jointly drivingly controlled. For instance, if a cotton module is being conveyed over door segment 24, thereby slowing conveyor chain 48 and loading drive 38, conveyor chain 50 will be similarly slowed, such that the transition of the module to door segment 28 will not be abrupt and possibly damaging. Additionally, conveyor chains 48 and 50 can be controlled separately of conveyor chains 22 on floor surface 20 of module builder 12, such that when a module being unloaded has past from floor surface 20, operation of conveyor chains 22 can be ceased, such that any loose cotton that falls onto floor surface 20 after passage of a cotton module from chamber 16, can be contained within the chamber on floor 20, so as not to be susceptible to loss or falling into any gaps between door assembly 14 and module builder 12.

Here, it should be additionally noted that door assembly 14 also has utility for loading cotton modules into module builder 12, by reversal of directions A and B.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inven-

What is claimed is:

1. A pivoting conveyor door assembly, comprising:
 a first door segment including a first conveying surface thereon including at least one endless conveyor extending in a predetermined direction thereover between opposite first and second end portions thereof;
 a second door segment including a second conveying surface thereon including at least one endless conveyor extending in the predetermined direction thereover between first and second end portions thereof;
 a first pivot arm extending from the second end portion of the first door segment opposite the conveying surface thereof, a second pivot arm extending from the first end portion of the second door segment opposite the conveying surface thereof, the first and second pivot arms having distal end portions pivotably connected for relative pivotal movement of the door segments about a pivotal axis extending through the distal end portions transversely to the predetermined direction, between a folded position in generally overlaying relation with the first and second conveying surfaces facing in opposite directions, and an open position in end-to-end relation wherein the first and second conveying surfaces form a substantially continuous surface extending in the predetermined direction and the pivotal axis is located beneath the substantially continuous surface; and
 a door conveyor drive having an output rotatable about a rotational axis therethrough, the door conveyor drive being supported by at least one of the door segments such that the rotational axis of the output is substantially coaxial with the pivotal axis and the output and the drive are located beneath the substantially continuous surface when the door segments are in the open position, the output being connected in rotatably driving relation to rotatable elements on the first and second door segments drivingly connected with the conveyors thereof, respectively, such that rotation of the output by the drive will simultaneously drivingly rotate the rotatable elements and move the conveyors over the door segments in the predetermined direction.

2. The door assembly of claim 1, wherein the output is connected in rotatably driving relation to the rotatable elements by endless elements encircling the output and at least one of the rotatable elements on each of the door segments, respectively.

3. The door assembly of claim 1, wherein the conveying surfaces of the door segments each comprise a low friction material.

4. The door assembly of claim 1, wherein the conveying surfaces of the door segments are in edge-to-edge relation when the door segments are in the open position.

5. The door assembly of claim 1 wherein the first and second pivot arms are connected for relative pivotal movement about the pivotal axis by a pivot joint through the distal ends thereof, and the output of the drive extends through and is rotatable relative to the pivot joint.

6. The door assembly of claim 1, wherein the output includes first and second drive sprockets, the first drive sprocket and a first driven sprocket on the rotatable element on the second end portion of the first door segment are encircled by a first drive chain, and the second drive sprocket and a second driven sprocket on the rotatable element on the first end of the second door segment are encircled by a second drive chain.

7. The door assembly of claim 6, wherein the conveyors comprise chains encircling sprockets on the rotatable elements.

8. The door assembly of claim 1, wherein the first end portion of the first door segment is mounted and supported on a cotton module builder such that in the folded position the first door segment will be located in a generally upstanding orientation in at least partially covering relation to an opening in connection with a cotton compacting chamber of the module builder and the second door segment will be in overlaying relation to the first door segment with the drive located therebetween, and such that when in the open position the door segments will extend outwardly from the opening in at least substantially parallel relation to a floor in the chamber to form a substantially continuous, flat path for conveying of cotton modules thereover.

9. The door assembly of claim 8, wherein the floor of the module builder includes at least one endless conveyor movable thereover in the predetermined direction by a floor conveyor drive separate from the door conveyor drive, such that operation of the floor drive can be ceased when a cotton module passes from the chamber such that loose cotton that falls onto the floor as the module passes therefrom will be retained in the chamber.

10. A pivoting conveyor door assembly, comprising:
 a first door segment including a first end portion adapted to be pivotally mounted to a cotton module builder adjacent to a bottom end of opening thereof through which cotton modules can be unloaded from a module building chamber of the module builder, the first door segment being pivotally movable between a closed position so as to be located in at least partial closing relation to the opening when mounted to the module builder, and an open position oriented at about a 90 degree angle to the closed position so as to extend outwardly in a predetermined direction from a floor of the module building chamber, the first door segment having a conveying surface thereon including at least one endless conveyor operable to move in the predetermined direction thereover toward a second end portion opposite the first end portion;
 a second door segment having opposite first and second end portions and a conveying surface extending therebetween, the first end portion of the second door segment being pivotally connected to the second end portion of the first door segment for relative pivotal movement of the door segments about a pivotal axis transverse to the predetermined direction between a generally upstanding folded position with the second door segment in a generally upstanding orientation in side-by-side relation to the first door segment when in the closed position, and an unfolded position with the second door segment in end-to-end generally coplanar relation with the first door segment when in the open position, the conveying surface of the second door segment including at least one endless conveyor operable to move in the predetermined direction thereover from the first end portion thereof toward the second end portion thereof, the pivotal axis being located beneath the conveying surfaces when the door segments are in the unfolded position; and
 a drive supported by at least one of the door segments so as to be located beneath the conveying surfaces thereof when the door segments are in the unfolded position, the drive including an output rotatable about a rotational axis the rotational axis substantially coaxial with the pivotal axis and connected in driving relation to the conveyors on the first and second door segments, such that rotation of the output by the drive will simultaneously drivingly move the conveyors over the door segments in the predetermined direction.

11. The door assembly of claim 10, wherein the output is connected in rotatably driving relation to elements on the door segments rotatable for moving the conveyors in the predetermined direction thereover, respectively, by endless elements encircling the output and the rotatable elements on each of the door segments, respectively.

12. The door assembly of claim 10, wherein the conveying surfaces of the door segments each comprise a low friction material.

13. The door assembly of claim 10, wherein the conveying surfaces of the door segments are in edge-to-edge relation when the door segments are in the unfolded position.

14. The door assembly of claim 10, wherein the output includes first and second drive sprockets, the conveyor on the first door segment includes a first driven sprocket, the first drive sprocket and the first driven sprocket being encircled by a first drive chain, and the conveyor on the second door segment includes a second driven sprocket, the second drive and driven sprockets being encircled by a second drive chain.

15. The door assembly of claim 14, wherein the conveyors comprise chains.

16. The door assembly of claim 10, wherein the first and second door segments are connected for relative pivotal movement about the pivotal axis by a pivot joint, and the output of the drive extends through, and is rotatable relative to, the pivot joint.

17. The door assembly of claim 10, wherein the first and second door segments are connected for relative pivotal movement about the pivotal axis by at least one pivot joint, and the output of the drive is coaxial with, but separate from, the at least one pivot joint.

18. A pivoting conveyor door assembly, comprising:

a first door segment including a first end portion pivotally mounted to a cotton module builder adjacent to a bottom end of opening thereof through which cotton modules can be unloaded from a module building chamber of the module builder, the first door segment being pivotally movable between a closed position in at least partial closing relation to the opening, and an open position oriented at about a 90 degree angle to the closed position and extending outwardly in a predetermined direction from a floor of the module building chamber, the first door segment having a conveying surface thereon including at least one endless conveyor operable to move in the predetermined direction thereover toward a second end portion opposite the first end portion;

a second door segment having a first end portion connected by a pivot joint to the second end portion of the first door segment for relative pivotal movement of the door segments about a pivotal axis transverse to the predetermined direction between a generally upstanding folded position with the second door segment in a generally upstanding orientation in side-by-side relation to the first door segment when in the closed position, and an unfolded position with the second door segment in end-to-end generally coplanar relation with the first door segment when in the open position, the second door segment having a conveying surface thereon including at least one endless conveyor drivingly operable to move in the predetermined direction thereover from the first end portion thereof toward a second end portion thereof; and a drive including an output rotatable about a rotational axis, the rotational axis substantially coaxial with the pivotal axis and connected in driving relation to the conveyors on the first and second door segments, such that rotation of the output by the drive will simultaneously drivingly move the conveyors over the door segments in the predetermined direction.

19. The door assembly of claim 18, wherein the output is connected in rotatably driving relation to elements on the door segments rotatable for moving the conveyors in the predetermined direction thereover, respectively, by endless elements encircling the output and the rotatable elements on each of the door segments, respectively.

20. The door assembly of claim 18, wherein the conveying surfaces of the door segments each comprise a low friction material.

21. The door assembly of claim 18, wherein the conveying surfaces of the door segments are in edge-to-edge relation when the door segments are in the unfolded position.

22. The door assembly of claim 18, wherein the output includes first and second drive sprockets, the conveyor on the first door segment includes a first driven sprocket, the first drive sprocket and the first driven sprocket being encircled by a first drive chain, and the conveyor on the second door segment includes a second driven sprocket, the second drive and driven sprockets being encircled by a second drive chain such that when the output of the drive is rotated the conveyors on the door segments will be rotatably driven thereby.

23. The door assembly of claim 18, wherein the output extends axially through the pivot joint.

24. The door assembly of claim 18, wherein the drive and the output are separate from the pivot joint.

* * * * *